US008196282B2

(12) United States Patent
Chen et al.

(10) Patent No.: US 8,196,282 B2
(45) Date of Patent: Jun. 12, 2012

(54) METHODS OF MAKING SPEAKERS

(75) Inventors: Ming-Daw Chen, Hsinchu (TW); Chang-Ho Liou, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 283 days.

(21) Appl. No.: 12/370,599

(22) Filed: Feb. 13, 2009

(65) Prior Publication Data

US 2010/0024198 A1 Feb. 4, 2010

Related U.S. Application Data

(60) Provisional application No. 61/107,328, filed on Oct. 21, 2008.

(51) Int. Cl.
*H04R 31/00* (2006.01)
*H01S 4/00* (2006.01)

(52) U.S. Cl. ........................................ 29/594; 29/592.1

(58) Field of Classification Search .................... 29/594, 29/592.1; 381/150, 191; 181/157
See application file for complete search history.

(56) References Cited

U.S. PATENT DOCUMENTS 3,894,199 A * 7/1975 Tamura et al. ................ 381/116
6,594,369 B1 * 7/2003 Une ............................. 381/174
6,806,593 B2 * 10/2004 Tai et al. ........................ 307/400
6,842,964 B1 * 1/2005 Tucker et al. .................... 29/594
6,920,225 B2 * 7/2005 Yonehara et al. ............. 381/174
7,386,136 B2 * 6/2008 Ohbayashi et al. ........... 381/174
7,517,548 B2 * 4/2009 Araki et al. ...................... 427/58
8,107,651 B2 * 1/2012 Liou et al. ...................... 381/191
2003/0068055 A1 * 4/2003 Tanabe et al. ................. 381/191
2007/0165896 A1 * 7/2007 Miles et al. .................... 381/356
2007/0195976 A1 * 8/2007 Sekino et al. ................. 381/191
2007/0242844 A1 * 10/2007 Harman ......................... 381/191
2009/0016551 A1 * 1/2009 Chiang et al. ................. 381/191
2009/0060233 A1 * 3/2009 Liou et al. ...................... 381/191
2009/0060234 A1 * 3/2009 Liou et al. ...................... 381/191
2009/0060249 A1 * 3/2009 Liou et al. ...................... 381/386
2009/0067648 A1 3/2009 Liou et al.
2009/0067663 A1 * 3/2009 Ivey et al. ...................... 381/386
2009/0110228 A1 * 4/2009 Chien et al. ................... 381/386

(Continued)

FOREIGN PATENT DOCUMENTS

KR 100751012 8/2007

(Continued)

OTHER PUBLICATIONS

"Office Action of Taiwan Counterpart Application" issued on Oct. 13, 2010, p. 1-p. 6.
"Office Action of U.S. Appl.No. 12/427,750" issued on Mar. 16, 2012, pp. 1-7, in which the listed references were cited.

*Primary Examiner* — David Angwin
(74) *Attorney, Agent, or Firm* — Jianq Chyun IP Office

(57) ABSTRACT

A method of making a speaker may be performed partially or completely in a roll-based processing. The method includes: providing an electrode; providing a membrane, which is treated to form an electret membrane by performing a ferroelectric process with a controlled external condition including at least one of humidity and temperature conditions; forming a conductive layer on the membrane; forming first supporting members on one of the electrode and the membrane; providing a substrate; forming second supporting members on one of the substrate and the membrane; and combining the electrode, the membrane, and the substrate to provide a first chamber and a second chamber, and the first supporting members are disposed between the electrode and the membrane in the first chamber and the second supporting members are disposed between the substrate and the membrane in the second chamber.

33 Claims, 9 Drawing Sheets

U.S. PATENT DOCUMENTS

| | | | | |
|---|---|---|---|---|
| 2009/0169036 | A1* | 7/2009 | Lee et al. | 381/191 |
| 2009/0214049 | A1* | 8/2009 | Lee et al. | 381/71.1 |
| 2009/0245547 | A1* | 10/2009 | Lee et al. | 381/191 |
| 2009/0304212 | A1* | 12/2009 | Han et al. | 381/191 |
| 2010/0024198 | A1* | 2/2010 | Chen et al. | 29/594 |
| 2010/0027814 | A1* | 2/2010 | Chen et al. | 381/150 |
| 2010/0034402 | A1* | 2/2010 | Lin et al. | 381/150 |
| 2011/0255719 | A1* | 10/2011 | Liou et al. | 381/191 |

FOREIGN PATENT DOCUMENTS

| | | |
|---|---|---|
| TW | I264960 | 10/2006 |
| TW | 200726300 | 7/2007 |
| TW | I294250 | 3/2008 |
| TW | 200939860 | 9/2009 |

* cited by examiner

METHODS OF MAKING SPEAKERS

RELATED APPLICATIONS

This application claims the benefit of U.S. Provisional Application No. 61/107,328, filed Oct. 21, 2008. The application is also related to a co-pending patent application submitted by the same applicants on Feb. 13, 2009, Ser. No. 12/370,598, entitled "SPEAKER DEVICES". The entire disclosures, including the claims, of aforesaid applications are hereby incorporated by reference herein and made a part of this specification.

BACKGROUND OF THE INVENTION

1. Field of the Invention

The present invention relates to methods of making speakers, and more specifically, to methods of making speakers that may be configured to integrate a roll-to-roll manufacturing process.

2. Description of Related Art

Visual and acoustic means are two effective ways of communication. As a result, scientists and engineers have continued to develop components and systems for visual or acoustic applications. One acoustic application may include the use of speakers, including electro-acoustic speakers. Electro-acoustic speakers may be categorized as direct and indirect radiant speakers. Generally, speakers can also be roughly categorized, based on their operating theories, into dynamic speakers, piezoelectric speakers and electrostatic speakers. Dynamic or magnetic-membrane speakers have been frequently used because of their well-developed technologies and have dominated the speaker market. However, dynamic or magnetic-membrane speakers may have disadvantages due to their large sizes, making them less desirable for portable or smaller-sized consumer products or for other applications that have space constraints.

In contrast, piezoelectric speakers operate based on the piezoelectric effects of piezoelectric materials and rely the application of electrical fields to piezoelectric materials to drive sound-producing diaphragms or membranes. Piezoelectric speakers generally require less space and may have thin or planar designs. However, piezoelectric materials formed by sintering processes may be rigid and inflexible.

Additionally, electrostatic speakers are generally designed with two fixed electrode-plates having holes and holding a conductive membrane between the two plates for forming a capacitor. A DC voltage bias may be applied to the membrane, and an AC voltage may be applied to the two electrodes. The electrostatic force generated by the positive and negative fields may drive the conductive membrane to generate sound.

U.S. Pat. No. 3,894,199 illustrates an example of a conventional speaker design. Referring to FIG. 1, reproduced based on FIG. 2 of U.S. Pat. No. 3,894,199, an electro-acoustic transducer is used and includes two fixed electrodes 110 and 120 placed at the two sides of a membrane 130. Each of the two fixed electrodes 110 and 120 has holes for allowing the produced sound to pass through the electrodes. The membrane 130 is placed between the two electrodes 110 and 120. The electrodes 110 and 120 are connected to an AC signal or power supply 160 through a transformer 150. When the AC signal is applied to the electrodes 110 and 120, the variations in the voltage differences between the electrodes 110 and 120 cause the electrical field between the electrodes to vary, causing the membrane 130 to vibrate and produce sound.

The electro-acoustic transducer as illustrated can be bulky or expensive to make, and the design may provide limited efficiency in some applications. In addition, the separate parts of the speak are usually manufactured or assembled individually in mass production. The design process, manufacturing process, or both may require the speakers to be mass-produced with fixed sizes, fixed shapes, or predetermined appearances and structures.

Therefore, it may be desirable to have alternative methods of making speakers that may overcome, or be configured to overcome, one or more of the disadvantages associated with certain conventional manufacturing processes or may be configured to make soft, thin, or flexible speakers with added flexibility in its designs or with low driving voltages.

SUMMARY OF THE INVENTION

One of the disclosed embodiments includes a method of making a speaker. The method may include: providing an electrode; providing a membrane; forming a conductive layer on the membrane; forming a plurality of first supporting members on one of the electrode and the membrane; providing a substrate; forming a plurality of second supporting members on one of the substrate and the membrane; and combining the electrode, the membrane, and the substrate to provide a first chamber between the electrode and membrane and to provide a second chamber between the membrane and the substrate.

Another of the disclosed embodiments may include a method of making a speaker. The method may include: providing an electrode; providing a membrane; forming a conductive layer on the membrane; forming a plurality of first supporting members on one of the electrode and the membrane; providing a substrate; forming a plurality of second supporting members on one of the substrate and the membrane; combining the electrode, the membrane, and the substrate to provide a first chamber between the electrode and membrane and to provide a second chamber between the membrane and the substrate. Specifically, one of the electrode, the membrane, and the substrate may be provided in a form of a roll-based material. Therefore, at least one of the steps of forming the conductive layer on the membrane; the step of forming the plurality of first supporting members on one of the electrode and the membrane; the step of forming the plurality of second supporting members on one of the substrate and the membrane; and the step of combining the electrode, the membrane, and the substrate may be performed as a roll-based processing.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
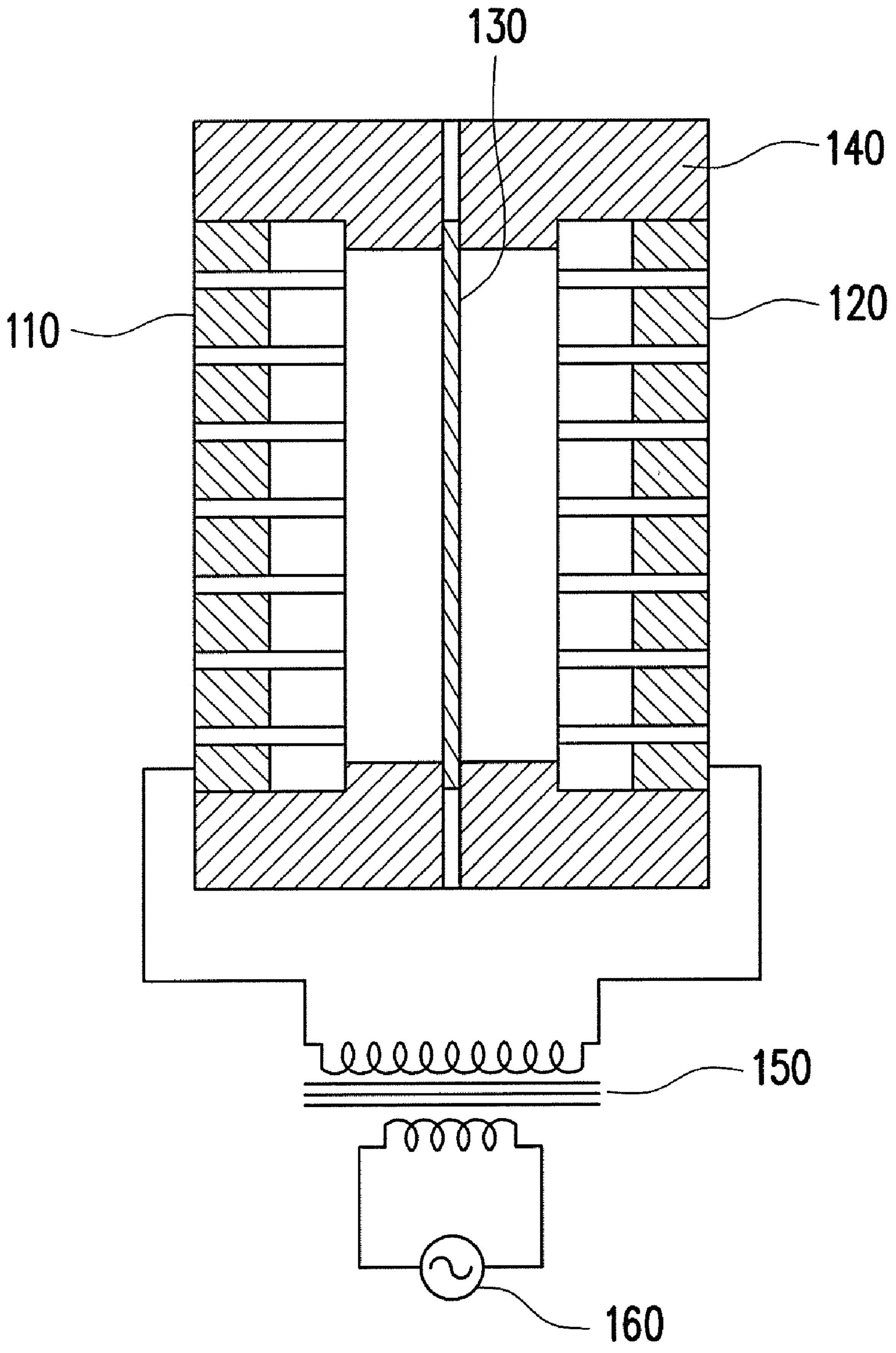
FIG. 1 (PRIOR ART)
FIG. 1 is a schematic structural view of an electro-acoustic transducer in the prior art.

Flexible or portable electronic devices generally have the characteristics of being soft, thin, or flexible and may have low driving voltages for various applications. Embodiments consistent with the present invention may provide partially or fully roll-to-roll-based methods for making speakers, including flexible speakers. For flexible speakers having electret vibrating membranes, a roll-to-roll processing using materials supplied in rolls may be used. A process such as stamping, die casting, and/or bonding may be applied, making the process cost-effective under certain circumstances.

Consistent with the disclosed embodiments, the proposed methods may offer flexibilities in making speakers having large membrane areas, irregular shapes, or other customizable characteristics.

Examples of speaker devices are described with the embodiments described below. Additional descriptions of variations in speaker designs may be found in two other co-pending patent applications submitted by the same applicants and respectively entitled "SPEAKER DEVICES" (application Ser. No. 12/370,598) and "SPEAKER DEVICES AND METHODS OF MAKING THE SAME" (application Ser. No. 12/727,750). The applicants hereby incorporate by reference the entire disclosures, including the claims, of both applications.

In some embodiments, a speaker device may include a substrate, a diaphragm or membrane above the substrate, an electrode above the membrane, a plurality of first supporting members, and a plurality of second supporting members. Specifically, the first or upper chamber is enclosed between the electrode and the membrane, and the second or lower chamber is enclosed between the membrane and the substrate. The first supporting members are provided in the upper chamber space, and the second supporting members are provided in the lower chamber space, which may be called a sound-chamber.

In some embodiments, the supporting members may have different patterns in placing the members or heights, which can be varied based on different applications or specifications. The sound-chamber structure may be placed in a space opposite to a soniferous hole region, i.e., the upper chamber, of the speaker, and the positions of the first supporting members and of the second supporting members may be symmetrical. The structure design and layout of the sound-chamber supporting members may improve the frequency response of the speaker. In various embodiments, the number of the first supporting members can be greater than, equal to, or less than the number of the second supporting members depending on various design requirements or considerations.

In some embodiments, the sound-chamber structure of a flat electrostatic speaker can be fabricated through integrating the existing processes of making flat electrostatic speakers and therefore may be suitable for mass production.

The flat electrostatic speaker may operate based on the principle that when a membrane is stimulated by an external voltage, the surface of the membrane deforms based on the charge characteristics of the membrane material and the electrostatic force. The deformations of the membrane drive the air surrounding the membrane to produce sound. The force exerted onto the membrane can be derived or estimated based on electrostatic force formulas and law of energy. As an example, the force may be the capacitance of the entire speaker times the internal electric field and the input voltage. Generally, the larger the force exerted onto the membrane is, the greater the sound output becomes.

Electrostatic speakers may be designed to be light, thin and/or flexible. In some embodiments, a sound-chamber structure with light, thin and/or flexible features may be placed in a space opposite to the soniferous hole regions of the speaker. The sound-chamber structure may include a plurality of appropriate sound-chamber supporting members, which may be the second supporting members, placed on a substrate. The sound-chamber supporting members and the supporting members can be respectively fabricated or formed on the substrate or the membrane electrode. The supporting members can be placed on the sound-chamber electrode or the membrane electrode with or without adhesives. The sound-chamber supporting members can also be manufactured in advance, followed by placing them between the membrane electrode and the substrate. The layout of the sound-chamber supporting members may be varied based on one or more design considerations, such as the electrostatic effect of the membrane, its frequency response, etc.

The layout design of the sound-chamber supporting members may vary based on the placement of the supporting members in a flat electrostatic speaker. On the other hand, the supporting members, which may be the first supporting members, located in the space of the flat electrostatic speaker opposite to the sound-chamber supporting members, may be designed with different patterns or heights based on audio-frequency characteristics. In one embodiment, the sound-chamber may contain sound-absorbing material, which may enhance the far-field effect and/or omni-directivity effect of the sound field.

The sound-chamber structure design of a flat electrostatic speaker in one embodiment may include sound-chamber supporting members in a chamber space. The design of the sound-chamber supporting members may be adjusted or optimized based on design considerations such as acoustic frequency requirements, frequency responses, or other acoustic or structural factors. The design variations may include at least variations in the placements and heights of the supporting members. As an example, the sound-chamber supporting members may have a spot-shape, a grid-shape, a cross-like-shape, any other shapes, or a combination of two or more shapes. Formulating a design under different design considerations may also include adjusting the distance between any two adjacent sound-chamber supporting members according to acoustic frequency requirements, frequency responses, or other acoustic or structural considerations.

Sound-chamber supporting members may be fabricated on a substrate using transfer printing, transfer adhesion, or direct printing such as inkjet printing or screen printing. In another embodiment, the supporting members may be fabricated by direct adhesion. As an example, the supporting members may be fabricated in advance, followed by placing the pre-fabricated supporting members between a metal electrode with holes and the membrane. The supporting members may be placed on the membrane or the metal electrode with holes with direct adhesion or without direct adhesion to the underlying membrane or electrode. In other embodiments, the supporting members can be fabricated using etching, photolithography, and/or adhesive-dispensing techniques.

In some embodiments, a speaker unit may include a single metal electrode and a single membrane having electric charges. Taking advantage of a flexible membrane having electrets, a speaker unit may be fabricated using a continuous or partially continuous roll-to-roll process. In contrast, the conventional process may require a specific design and production flow, which generates a specific, individual speaker-design for mass producing the same design. A mass production manufacturing method usually forms the speaker membranes and the speakers individually based on the same design, which can be difficult to modify during the manufacturing process. As an example, a roll-to-roll process consistent with the disclosed embodiments may be conducted with stamping, press casting and adhesion processes to form the primitive products (i.e. the membranes) of speakers. The membranes may be formed with a large area, such as being formed as a roll of membrane. The proposed process may significantly reduce the fabrication cost of speakers. In particular, the primitive products in roll shapes may offer flexibilities in having or fabricating various designs, especially designs that may require large areas, irregular shapes, or customized shapes or designs that have many variations.

Figure 2:
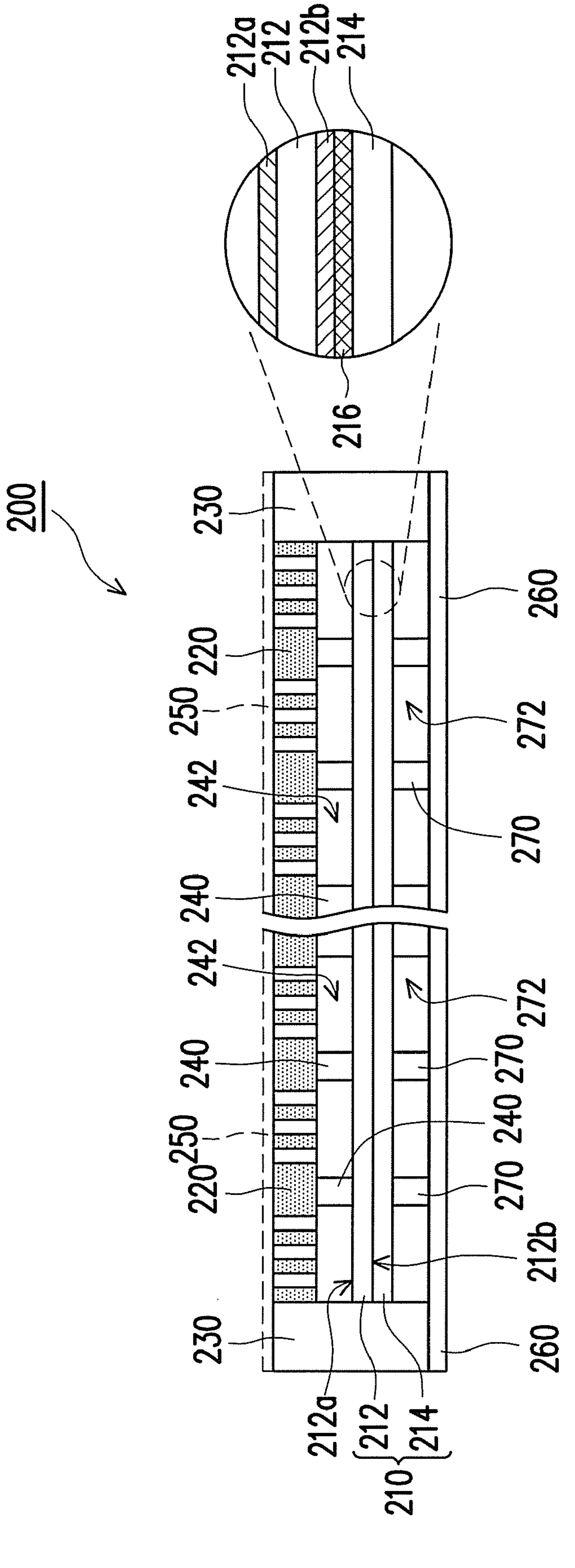
FIG. 2 is a schematic cross-sectional view of a speaker according to an embodiment consistent with the present invention.

Referring to FIG. 2, a speaker 200 may have several working areas for a membrane 210 located between any two adjacent supporting members. The two sides of the membrane 210 may have its working areas defined in the same way or defined differently. The sound-chamber structure as illustrated may have two chamber spaces, one above the membrane 210 and one below it, for producing the resonant sound fields or effects of the speaker. The speaker 200 may have a plurality of supporting members, which may be designed with specific shapes and placements within the upper and lower chamber spaces. In one embodiment, the upper chamber space in FIG. 2 may be a soniferous hole region, and the lower chamber space in FIG. 2 opposite to the soniferous hole region may be a sound-chamber structure 272. The lower chamber space between a substrate 260 and the membrane 210 may produce the resonant sound field of the speaker 200 through a plurality of working areas of the membrane located between any two adjacent sound-chamber supporting members.

The speaker unit 200 may include the membrane 210, an electrode layer 220 with a plurality of holes, a frame or frame supporting member 230 and a plurality of upper-chamber supporting members 240 between the electrode layer 220 and the membrane 210. At the side of the membrane 210 opposite to the electrode layer 220, there is the sound-chamber structure 272, which may be enclosed or partially-enclosed by substrate 260 and a plurality of sound-chamber (or lower-chamber) supporting members 270 between the membrane 210 and the substrate 260. The membrane 210 may include an electret layer 212 and a metal film electrode 214. In some embodiments, a top surface 212*a* of the electret layer 212 may be conductively coupled to the frame supporting member 230 and the supporting members 240, and the lower surface 212*b* of the electret layer 212 may be conductively coupled to the above-mentioned metal film electrode 214. An insulation layer 216 may be sandwiched between the electret layer 212 and the electrode 214

The electrode layer 220 with holes can be made of metal. In one embodiment, the electrode layer 220 can be made of an elastic material, such as paper or an extremely-thin, nonconductive material, plated with a metal film on the paper or the nonconductive material.

When the electrode layer 220 is made of a nonconductive material layer plated with a metal film layer, the nonconductive material can be plastic, rubber, paper, nonconductive cloth (cotton fiber or polymer fiber) or other nonconductive materials; and the metal film cam be aluminum, gold, silver, copper, Ni/Au bimetal, indium tin oxide (ITO), indium zinc oxide (IZO), macromolecule conductive material PEDOT (polyethylenedioxythiophene), etc.; an alloy; or any combination of the listed material or equivalents thereof. When the electrode layer 220 uses a conductive material, the conductive material can be metal (iron, copper, aluminum or an alloy thereof), conductive cloths (metal fiber, oxide metal fiber, carbon fiber or graphite fiber), etc., or any combination of these materials or other materials.

The electret layer 212 can be a dielectric material, which may be treated or electrified to allow it to keep static charges for a period of time or an extended period of time and have a stationary electric or static effect within the material after being charged. Therefore, the electret layer 212 is also known as an electret membrane layer. The electret layer 212 may have one or multiple dielectric layers. Example of the dielectric materials include FEP (fluorinated hylenepropylene), PTFE (polytetrafluoethylene), PVDF (polyvinylidene fluoride), fluorine polymer materials, or other appropriate materials. The dielectric material may include holes having diameters in micro-scale or nanometer-scale. Because the electret layer 212 may keep static charges for an extended period of time and may have piezoelectric characteristics after subject to an electrifying treatment, the holes within the membrane may increase transmission and enhance piezoelectric characteristics of the material. In one embodiment, after corona charging, dipolar charges may be produced and kept within the dielectric material to produce stationary electric or static effect.

To provide good tension and/or vibration effects of the membrane 210, the metal film electrode 214 may be a thin metal film electrode. As an example, its thickness may be between 0.2 micron and 0.8 micron or between 0.2 micron and 0.4 micron. It may be about 0.3 micron in some embodiments. The scale range illustrated is usually identified as "ultra-thin."

Taking the electret layer 212 with negative charges as an example, when an input audio signal is supplied to the electrode layer 220 with holes and the metal film electrode 214, a positive voltage from the input signal may produce an attracting force on the negative charges of the electret membrane, and a negative voltage from the input signal may produce a repulsive force on the positive charges of the unit so as to make the membrane 210 move in one direction.

In contrast, when the voltage phase of the input sound source signal is changed, a positive voltage may produce an attracting force on the negative charges of the electret membrane, and a negative voltage may produce a repulsive force on the positive charges of the unit so as to make the membrane 210 move in the direction opposite to the above-mentioned direction. The electret membrane may move back-and-forth repeatedly and vibrate to compress the surrounding air to produce sound through the interaction of different forces in different directions.

The speaker unit 200 in one embodiment can be covered by a film 250 on one side or on both sides. The film 250 may be air-permeable but waterproof and made of, for example, GORE-TEX® film containing ePTFE (expanded polytetrafluoroethylene), etc. GORE-TEX® or a similar material may be capable of preventing the effects of water and oxygen so as to prevent the electret layer 212 from leaking its charges and having its stationary electric effect reduced.

A plurality of working areas of membrane 210 may be formed between any two adjacent supporting members 240 and between the above-mentioned electrode layer 220 and the membrane 210. These working areas in the upper chamber space 242 may be used for producing resonant sound fields of the speaker 200. A plurality of working areas of membrane 210 may be formed between any two adjacent sound-chamber supporting members 270 and between the substrate 260 and the membrane 210. These working areas in the lower chamber space 272 may also be used for producing resonant sound fields of the speaker 200. Both the supporting members 240 and the sound-chamber supporting members 270 may be adjusted, as part of the speaker design, in their placements in the chambers, their heights, and their shapes. In addition, the number of the sound-chamber supporting members 270 can be greater than, equal to or less than the number of the supporting members 240, and the supporting members 240 or the sound-chamber supporting members 270 can be fabricated directly on or over the electrode layer 220 or the substrate 260.

The sound-chamber structure is near the surface of the metal film electrode 214 of the membrane 210 and may be designed by considering the audio-frequency characteristic of the speaker or other acoustic or structural factors. The sound-chambers may include a sound-absorbing material; and the supporting members or the sound-chamber supporting members may be designed in various shapes. The chamber space formed by the frame supporting member 230 may have a sound hole 274 in the frame supporting member 230 for releasing the pressure of produced sound and, in some instances, create a better sound field effect.

Referring to FIG. 2 discussed above, the speaker 200 may include the membrane 210 having an electret material, the electrode layer 220 with holes, the frame 230, the supporting members 240 and 270. Specifically, the membrane 210 may include the electret layer 212, the metal film electrode 214, and the insulation layer 216.

Speaker devices having an electret membrane may be manufactured with partially or completely roll-to-roll manufacturing methods. For example, the speakers may be formed in rolls, rather than in individual units, by applying processes such as stamping, die casting, and/or bonding. In some embodiments, the process may significantly reduce manufacturing costs. Also, the speakers or speaker materials made in rolls may offer the flexibility of having various designs, such as speakers having large areas, irregular shapes, or customized dimensions, etc.

Examples of roll-to-roll manufacturing methods are illustrated with reference to FIGS. 3 to 5. The manufacturing processes respectively illustrated in FIGS. 3, 4 and 5 and their variations or combinations may be selected for manufacturing speakers or components of speakers separately, depending on design or manufacturing considerations.

Figure 3:
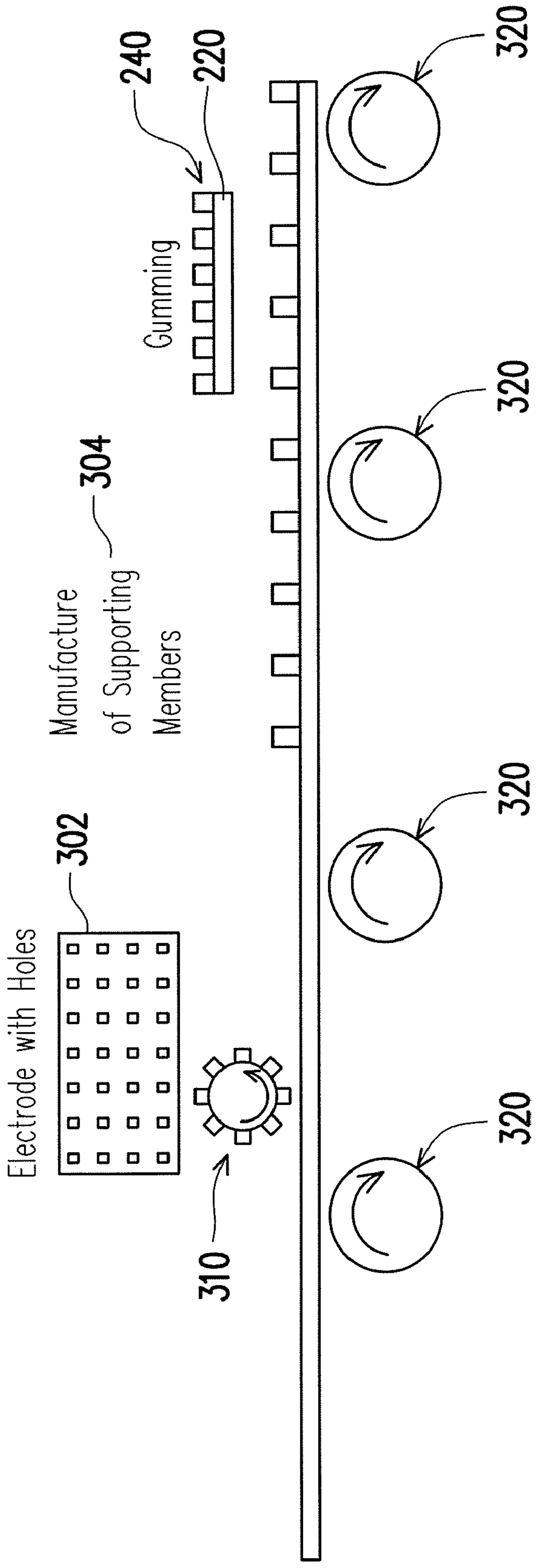
FIG. 3 is a schematic view of a step of forming a metal electrode with supporting members thereon in a roll-to-roll manufacturing process of a flexible speaker according to an embodiment consistent with the present invention.

Referring to FIG. 3, the illustrated process may be used for forming metal electrode or electrode layer 220 with supporting members 240 on the metal electrode. The metal electrode 220 may be made of a metal material or an elastic material plating with a metal thin film. The elastic material may be paper or ultra-thin non-conductive materials. The manufacturer process of forming a metal electrode with supporting members can be achieved by three processes, including forming a metal electrode with a plurality of holes, forming supporting members, and combining the metal electrode with the supporting members.

As discussed above, the supporting members are between the electret membrane 210 and the metal electrode 240. In one embodiment, the supporting members can be attached to the surface of the metal electrode 240 using adhesives or other methods of attachment, or attached to the surface of the membrane 210 using adhesives or other methods of attachment, or simply placed between the metal electrode 240 and the membrane 210. As an example, the supporting members may be gummed to the surface of the metal electrode substrate. The supporting members have various shapes, such as triangular prism, circular cylinder, hexagon or rectangle shapes. As discussed above, the placement or layout, height, shapes, and other features of the supporting members may vary depending on one or more design or manufacturing considerations.

Referring to FIG. 3, the metal electrode substrate may be driven forwards or fed by a plurality of rollers 240 or other material-feeding mechanisms. Holes may be formed in the metal electrode substrate by a device 310, which may perform stamping, cutting (cutter or laser cutting), or etching etc, so as to form electrode 302 with holes. As a second step, a plurality of supporting members may be formed, as indicated by supporting member 304 in the drawing, with different shapes, for example, particle, square, or hexagonal-shaped supporting member structures are all applicable to the design. As an example, the supporting may be formed with the same system or by another machine.

As a third step, the supporting members may be gummed or adhered to the metal electrode 302, which has the holes formed therein. In another embodiment, if it is not necessary to attach the supporting members to the metal electrode 302, the gumming step may be omitted. Accordingly, a large number of metal electrodes with supporting members may be manufactured. As an illustrative example, the metal electrode 302 as manufactured may have the supporting members 240 formed on or attached to the metal electrode 302.

Figure 4A:
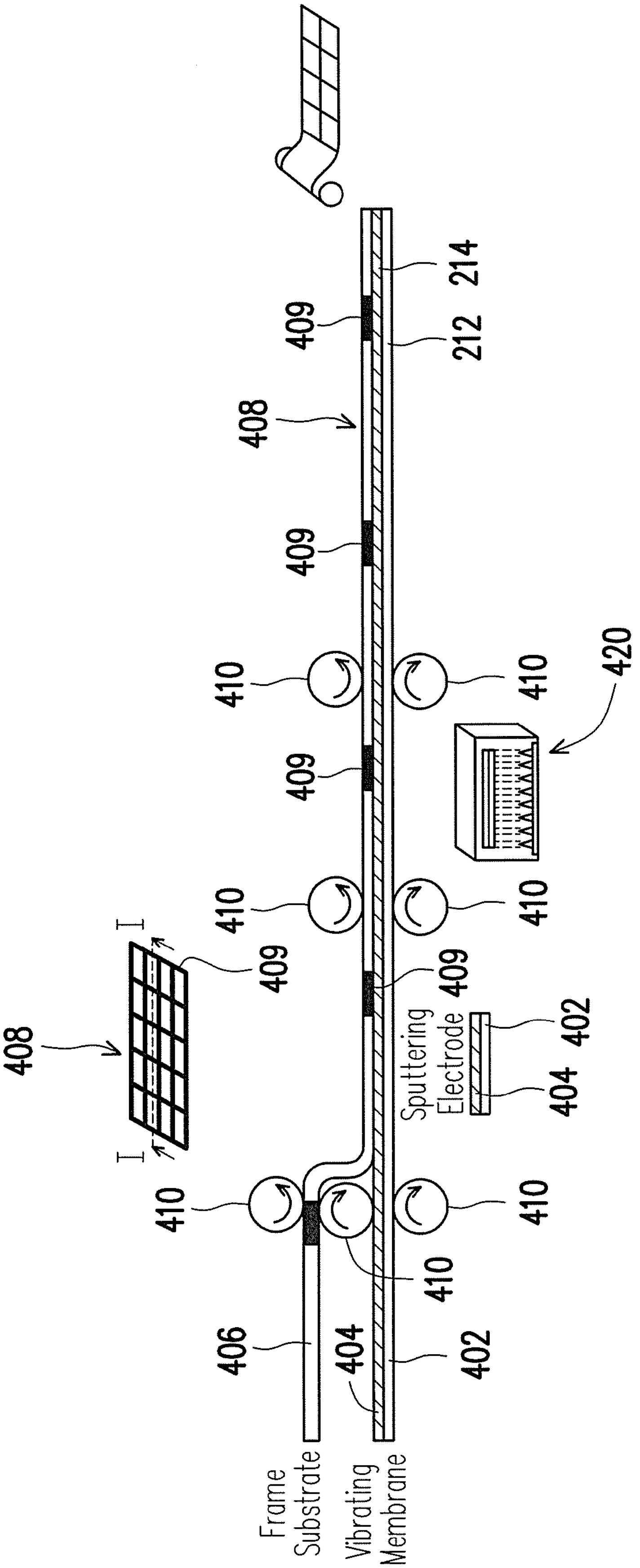
FIG. 4A is a schematic view of an embodiment of forming an electret membrane with a fixed frame in the roll-to-roll manufacturing process according to an embodiment consistent with the present invention.

FIG. 4A illustrates an embodiment of manufacturing membranes with a fixed frame. Rollers 410 or material-feeding mechanisms may be used to drive or feed a roll of materials forward. The process may include forming a membrane layer with an ultra-thin conductive metal layer, forming a patterned support layer using a frame substrate, performing a ferroelectric or treatment process to the membrane layer to form the electret membrane layer, and cutting the electret membrane layer to provide membranes for individual speakers.

In one embodiment, an ultra-thin metal layer 404 may be formed on a membrane or membrane material substrate 402, such as by sputtering, plating, or coating an electrode layer. In one embodiment, a roll-based material of the membrane layer may be selected, designed, or stretched to have suitable tension to allow a better combination of the patterned support layer with the membrane layer. A frame substrate 406, which may be designed or selected with an appropriate tension, may be formed on the membrane layer to provide a frame structure indicated by 408 in the drawing. In one embodiment, the frame structure 408 has a plurality of rectangle-shaped grids formed by the supporting layer or members 409. A vibrating membrane layer within the frame structure 408 (including the vibrating membrane 402 and the ultra-thin metal layer 404) may have an appropriate tension level or surface tension among the several layers and the characteristics may help to prevent curling problems that cause peeling of certain layer(s). The supporting members are not limited to the rectangle-shape illustrated and can have various shapes or arrangements illustrated above.

Additionally, a treatment may be performed to the membrane 402 to provide electrical charges. As an example, an equipment 420 having discharging tips may be used to perform the ferroelectric process or treatment, such as corona discharging. In one example, the equipment 420 discharging from its tips may perform the discharging process using probes arranged in an array. In one embodiment, control of treatment conditions, such as temperature, humidity, and level of discharge, may be used to adjust or improve charging effects. Although the treatment is illustrated as being performed immediately after the combination of the frame substrate 406 and the membrane 402, it may occur earlier or later during a manufacturing process. The illustrated process completes the formation of membranes for speakers.

Figure 4B:
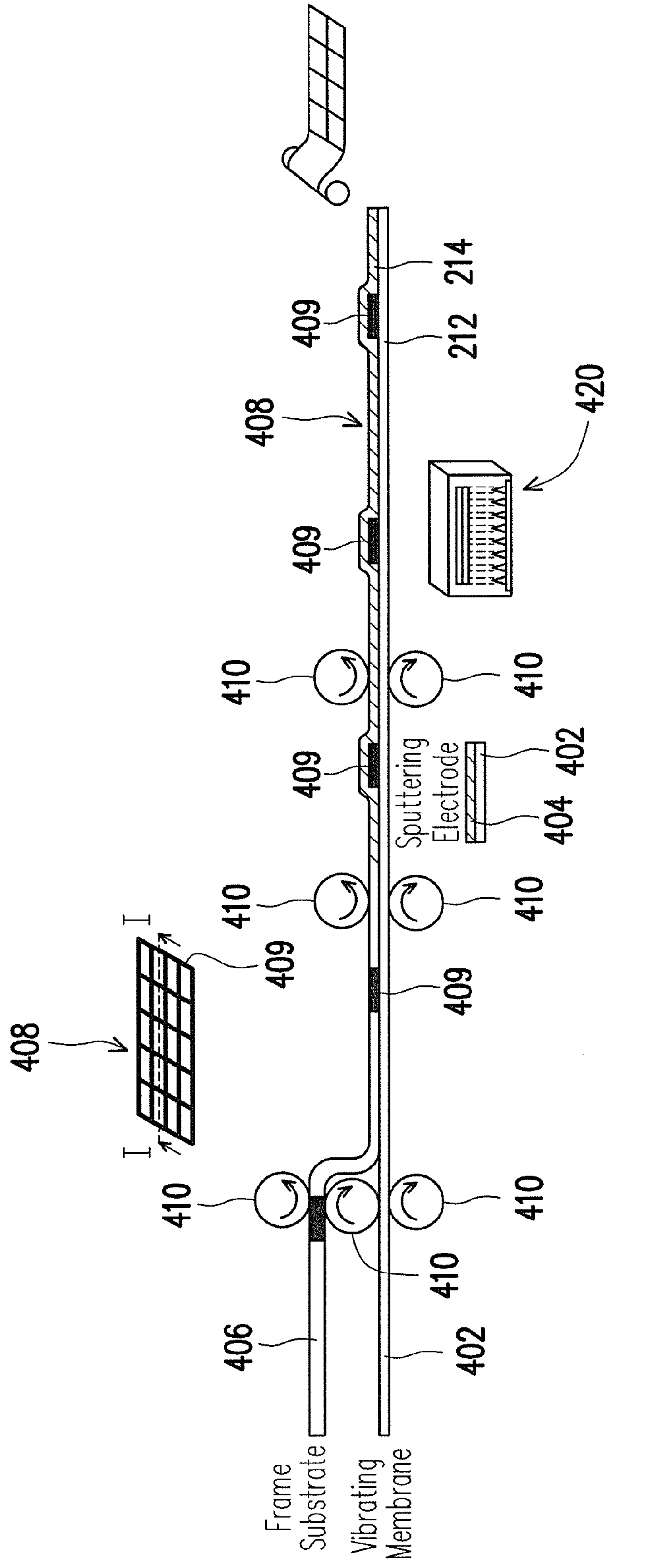
FIG. 4B is a schematic view of another embodiment of forming an electret membrane structure with a fixed frame in the roll-to-roll manufacturing process according to an embodiment consistent with the present invention.

FIG. 4B illustrates another manufacturing process of combining a membrane structure with a frame structure. Referring to FIG. 4B, rollers 410 or other material-feeding mechanisms may be used to drive or feed a roll of materials forward. The process may include combining a patterned support layer (on a frame substrate) with a membrane layer, forming a metal layer on the membrane layer having the patterned support layer, performing a ferroelectric process on the membrane layer to form an electret membrane, and cutting the electret membrane to form membranes for individual speakers.

Similar to the process illustrated above, the tensions or tensile strength of different layers of materials may be considered or adjusted to prevent possible curling problems, which may cause separation or peeling of one or more layers. The supporting members are not limited to the rectangle shape illustrated and can have various shapes or arrangements illustrated above.

The ultra-thin metal layer 404 may be formed on the membrane layer 402 having the patterned support layer on it, such as by sputtering, plating, or coating an electrode layer over an underlying layer. A ferroelectric treatment or process may be performed on the membrane structure.

Figure 5:
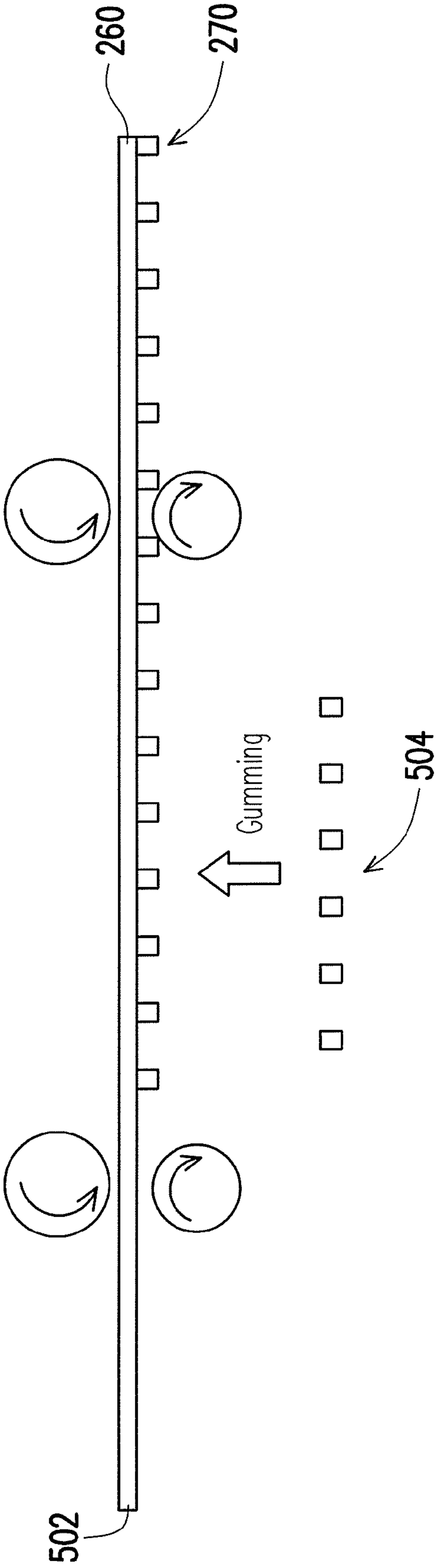
FIG. 5 is a schematic view of a step of forming a chamber with a fixed frame in the roll-to-roll manufacturing process according to an embodiment consistent with the present invention.

FIG. 5 illustrates a process of forming sound chambers by combining a substrate with supporting members. Referring to FIG. 5, supporting members 504 are formed over a substrate 502, which may be similar to the formation of supporting members on an electrode with holes, as illustrated above. The number of the supporting members 504 can be more than, equal to, or less than the number of the supporting members formed on the electrode. In one example, the arrangement, placement, or layout of supporting members 504 on the substrate 502 may be based on the electrostatic effect of the electret membrane, the audio response of the flexible speaker, and/or other design considerations illustrated above.

After the completion of (1) unit A including the membrane and the electrode and (2) unit B including the substrate and the lower-chamber supporting members, the two units may be assembled together—using a roll-based process or other processes. In the former case, the speaker units may be formed in rolls, which may be subsequently cut to form various applications. In other words, speakers in different shapes and sizes may be formed. When individual speaks are cut, the supporting members at the edges of the speakers may therefore become the outer frames coupling a substrate, a membrane, and an electrode. Alternatively, other outer frames may be added.

In some embodiments, the speaker units may be made of a material that is flexible, transparent, or both flexible and transparent. This may offer more design flexibility or diversity. As illustrated above, the number of the lower-chamber supporting members 504 may be equal to, less than, or greater than that of the upper-chamber supporting members 304, as shown in FIG. 3. The lower-chamber supporting members may be formed on the metal electrode or the membrane. Similarly, the lower-chamber supporting members 504 may be formed on the substrate the membrane, and the manufacturing process may be modified accordingly.

Accordingly, embodiments consistent with the present invention relate to methods of forming speakers, and mainly the roll-to-roll manufacturing process may be used to form flexible speakers. Membranes may be made with pores in nanometer or micrometer scales. The electrode and the electrode layer on the membrane may be respectively affected by different voltages from an input signal. According to Coulomb's law, the vibrating membrane may be affected by an attractive electrostatic force and a repulsive electrostatic force at the same time. The electrostatic force is directly proportional to a product of the bias multiplied by the sound signal voltage, and inversely proportional to a distance between the electrode plate with holes thereon and the electret piezoelectric vibrating membrane. Therefore, if the vibrating membrane provides a high ferroelectricity under the same distance, an AC input signal may provide the desired electrostatic force with a lower voltage. As an example, the ferroelectric magnitude caused by a voltage bias of hundreds to thousands of volts may be provided by the vibrating membrane with the nanometer or micrometer scale holes therein. Based on the computation discussed above, an input signal may have a voltage as low as tens of volts. A lower input voltage may improve the practicability of the flexible speakers in certain applications.

Figure 6:
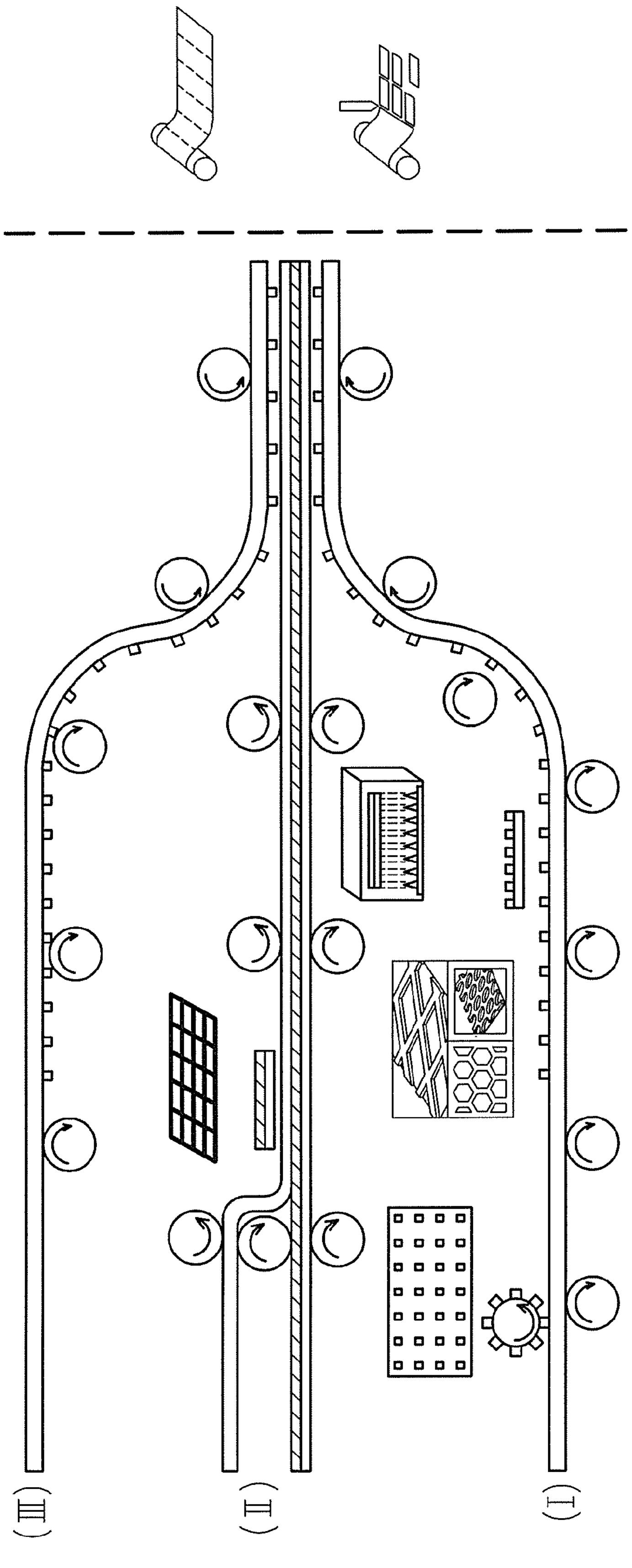
FIG. 6 is a schematic view of a roll-to-roll manufacturing process of a speaker according to an embodiment consistent with the present invention.

If the steps shown in FIGS. 3, 4A and 5 are integrated, as shown in FIG. 6, a manufacturing method may integrate different manufacturing processes (I), (II), and (III) respectively applied to a roll of a metal electrode, a roll of a membrane, and a roll of a substrate, which are respectively illustrated in FIGS. 3, 4A, and 5. In manufacturing processes (I) and (III), the supporting members may be formed on the metal electrode or on the substrate by many different methods, including transferring or trans-printing, printing technique (such as screen printing, inkjet printing, etc.), direct adhesion or mounting, photoresist growing or photolithography, dispensing, stamping, rolling, and etching. The supporting members of the electrode in the manufacturing process (I) or the supporting members in the manufacturing process (III) may be combined with the manufacturing process (II) by bonding, such as by coating glue on the vibrating membrane, the supporting members of the electrode, and/or the sound supporting members on the substrate and combining them together.

Figure 7:
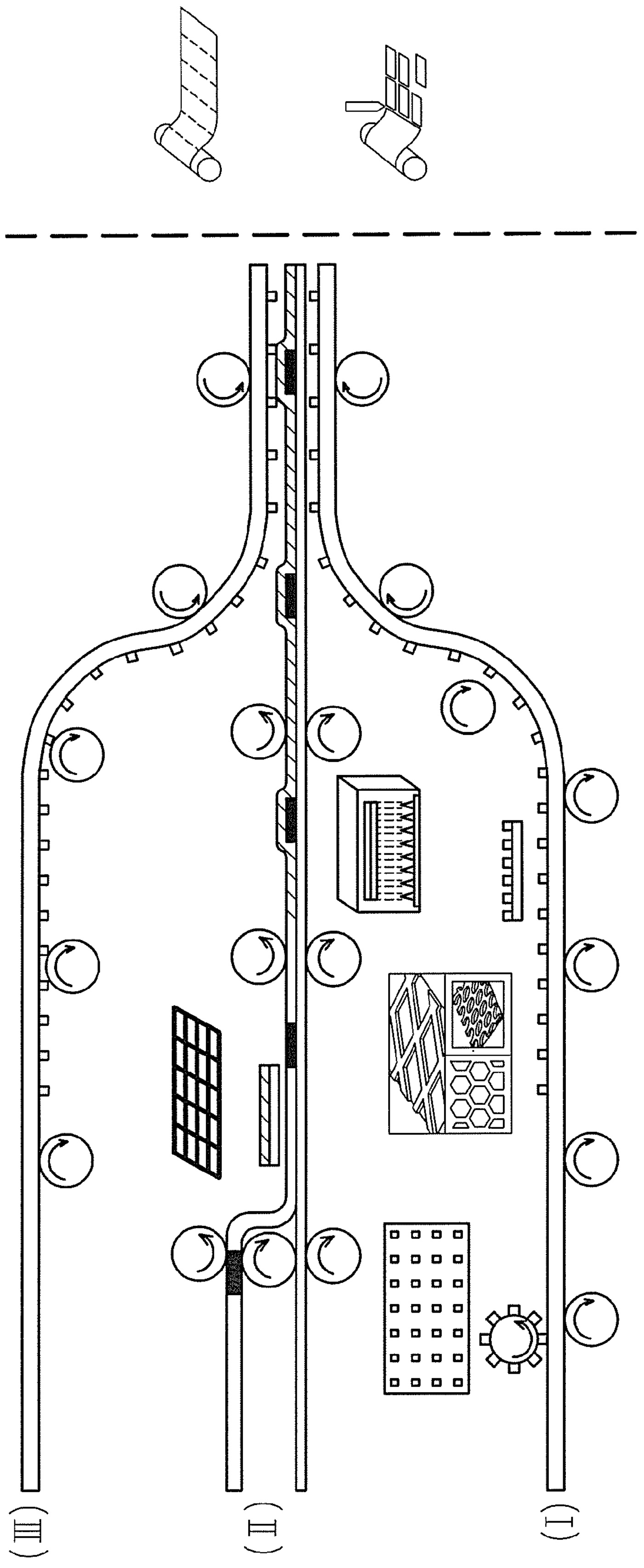
FIG. 7 is a schematic view of a roll-to-roll manufacturing process of a speaker according to another embodiment consistent with the present invention.

In another embodiment, if the steps shown in FIGS. 3, 4B and 5 are integrated, as shown in FIG. 7, a manufacturing method may include different manufacturing processes (I), (II), and (III), which may be respectively applied to a roll of a metal electrode, a roll of a membrane, and a roll of a substrate, which are respectively illustrated in FIGS. 3, 4B, and 5. Similarly, techniques such as transferring, trans-printing (such as screen printing and inkjet printing), direct adhesion, photoresist growing or photolithography, dispensing, stamping, rolling, and etching may be used for combining supporting members with an underlying surface. The materials from process (I), process (II), and process (III) may be combined with by bonding, which may include coating glues on the vibrating membrane, the supporting members of the electrode, and/or the substrate and combining them together.

Figure 8:
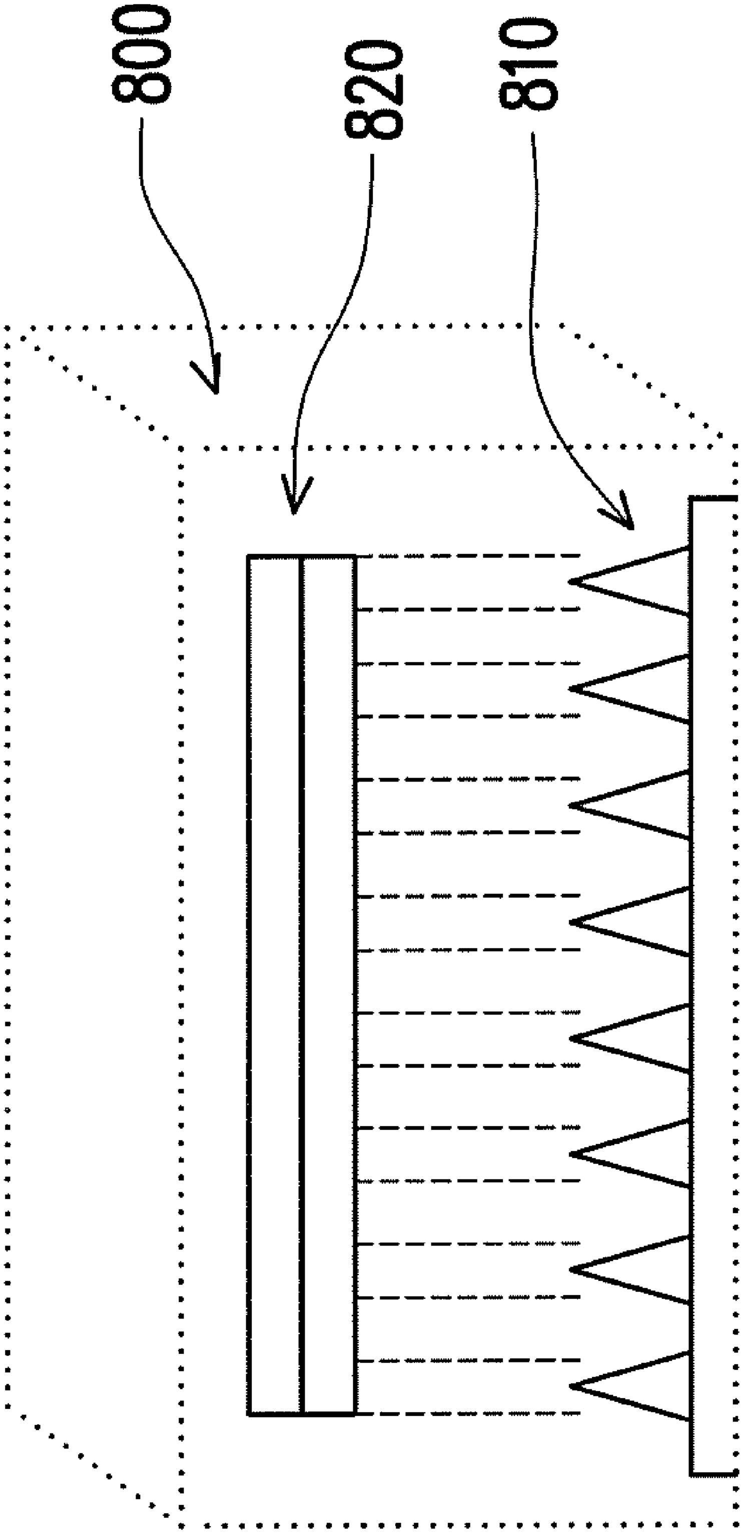
FIG. 8 is a schematic view of a ferroelectric processing device used in the step of forming an electret membrane according an embodiment consistent with the present invention.

Methods of making speakers may include a complete roll-to-roll process or a partial roll-to-roll process. Speakers may be formed as a multilayer structure through the illustrated processes. FIG. 8, illustrates a ferroelectric device applicable for forming membranes. Referring to FIG. 8, an equipment 800 discharging electricity at its tip as shown in FIG. 8 may be used for performing the ferroelectric process on a membrane 820 by probes 810 arranged in an array. The process may provide a uniform ferroelectric effect, thereby improving the quality and/or uniformity of the electret membrane produced through the process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of making a speaker, comprising:

providing an electrode;

providing a membrane, the membrane being treated to form an electret membrane by performing a ferroelectric process on the membrane with a controlled external condition including at least one of humidity and temperature conditions;

forming a conductive layer on the membrane;

forming a plurality of first supporting members on one of the electrode and the membrane;

providing a substrate;

forming a plurality of second supporting members on one of the substrate and the membrane; and combining the electrode, the membrane, and the substrate to provide a first chamber between the electrode and membrane and to provide a second chamber between the membrane and the substrate, by which the plurality of first supporting members are disposed between the electrode and the membrane in the first chamber and the plurality of second supporting members are disposed between the substrate and the membrane in the second chamber.

2. The method of claim 1, wherein at least one of the electrode, the membrane, and the substrate is provided in a form of a roll-based material.

3. The method of claim 1, further comprising cutting the combined electrode, the membrane, and the substrate to form at least one speaker.

4. The method of claim 1, further comprising forming a patterned support layer on the membrane.

5. The method of claim 1, wherein treating the membrane comprises performing a ferroelectric process on the membrane.

6. The method of claim 1, wherein the ferroelectric process performed on the membrane comprising discharging electricity at tips of a plurality of probes arranged in an array.

7. The method of claim 1, further comprising forming a frame coupled with the substrate, the membrane, and the electrode to provide the at least one speaker with a stacked-structure.

8. The method of claim 1, further comprising removing a portion of the electrode to provide a plurality of holes in the electrode.

9. The method of claim 1, wherein the first supporting members are in the first chamber, and the second supporting members are in the second chamber.

10. The method of claim 1, wherein the electrode is made of at least one of a metal film and an elastic material plated with a metal film.

11. The method of claim 10, wherein the elastic material comprises at least one of a paper or a ultra-thin non-conductive material.

12. The method of claim 1, wherein at least one of the first and second supporting members is formed with at least one of a circular shape, a rectangular shape, a triangular shape, and a hexagonal shape.

13. The method of claim 1, wherein forming the conductive layer on the membrane comprises at least one of sputtering, plating, and coating the conductive layer on the membrane.

14. The method of claim 1, wherein forming the plurality of first supporting members on one of the electrode and the membrane comprises:

forming the plurality of first supporting members; and after forming the plurality of first supporting members, placing the plurality of first supporting members on one of the electrode and the membrane.

15. The method of claim 1, wherein forming the plurality of second supporting members on one of the substrate and the membrane comprises:

forming the plurality of second supporting members; and after forming the plurality of second supporting members, placing the plurality of second supporting members on one of the substrate and the membrane.

16. The method of claim 1, further including forming at least some the second supporting members on one of the substrate and the membrane at positions corresponding to the positions of at least some of the first supporting members on one of the electrode and the membrane.

17. The method of claim 1, further including providing a pattern of arranging at least one of the first and second supporting members at least based on at least one of electrostatic characteristics of the membrane treated as an electret membrane and a frequency response of a to-be made speaker.

18. A method of making a speaker, comprising:

providing an electrode;

providing a membrane and treating the membrane to form an electret membrane by performing a ferroelectric process on the membrane with a controlled external condition including at least one of humidity and temperature conditions;

forming a conductive layer on the membrane;

forming a plurality of first supporting members on one of the electrode and the membrane;

providing a substrate;

forming a plurality of second supporting members on one of the substrate and the membrane; and combining the electrode, the membrane, and the substrate to provide a first chamber between the electrode and membrane and to provide a second chamber between the membrane and the substrate, wherein at least one of the electrode, the membrane, and the substrate is provided in a form of a roll-based material and at least one of forming the conductive layer on the membrane; forming the plurality of first supporting members on one of the electrode and the membrane; forming the plurality of second supporting members on one of the substrate and the membrane; and combining the electrode, the membrane, and the substrate comprises a roll-based processing.

19. The method of claim 18, further comprising cutting the tri-layer structure of the electrode, the membrane, and the substrate to form at least one speaker.

20. The method of claim 18, further comprising forming a patterned support layer on the membrane.

21. The method of claim 18, wherein treating the membrane comprises performing a ferroelectric process on the membrane.

22. The method of claim 18, wherein the ferroelectric process performed on the membrane comprising discharging electricity at tips of a plurality of probes arranged in an array.

23. The method of claim 18, further comprising forming a frame coupled with the substrate, the membrane, and the electrode to provide the at least one speaker with a stacked-structure.

24. The method of claim 18, further comprising removing a portion of the electrode to provide a plurality of holes in the electrode.

25. The method of claim 18, wherein the first supporting members are in the first chamber, and the second supporting members are in the second chamber.

26. The method of claim 18, wherein the electrode is made of at least one of a metal film or an elastic material plated with a metal film.

27. The method of claim 26, wherein the elastic material comprises at least one of a paper and a ultra-thin non-conductive material.

28. The method of claim 18, wherein at least one of the first and second supporting members is formed with at least one of a circular shape, a rectangular shape, a triangular shape, and a hexagonal shape.

29. The method of claim 18, wherein forming the conductive layer on the membrane comprises at least one of sputtering, plating, and coating the conductive layer on the membrane.

30. The method of claim 18, wherein forming the plurality of first supporting members on one of the electrode and the membrane comprises:

forming the plurality of first supporting members; and placing the plurality of second supporting members on one of the electrode and the membrane.

31. The method of claim 18, wherein funning the plurality of second supporting members on one of the substrate and the membrane comprises:

forming the plurality of second supporting members; and placing the plurality of second supporting members on one of the substrate and the membrane.

32. The method of claim 18, wherein at least some the second supporting members are formed on one of the substrate and the membrane at positions corresponding to the positions of at least some of the first supporting members on one of the electrode and the membrane.

33. The method of claim 18, wherein a pattern of arranging at least one of the first and second supporting members is at least based on at least one of electrostatic characteristics of the membrane treated as an electret membrane and a frequency response of a to-be made speaker.

* * * * *